United States Patent Office 3,446,942
Patented May 27, 1969

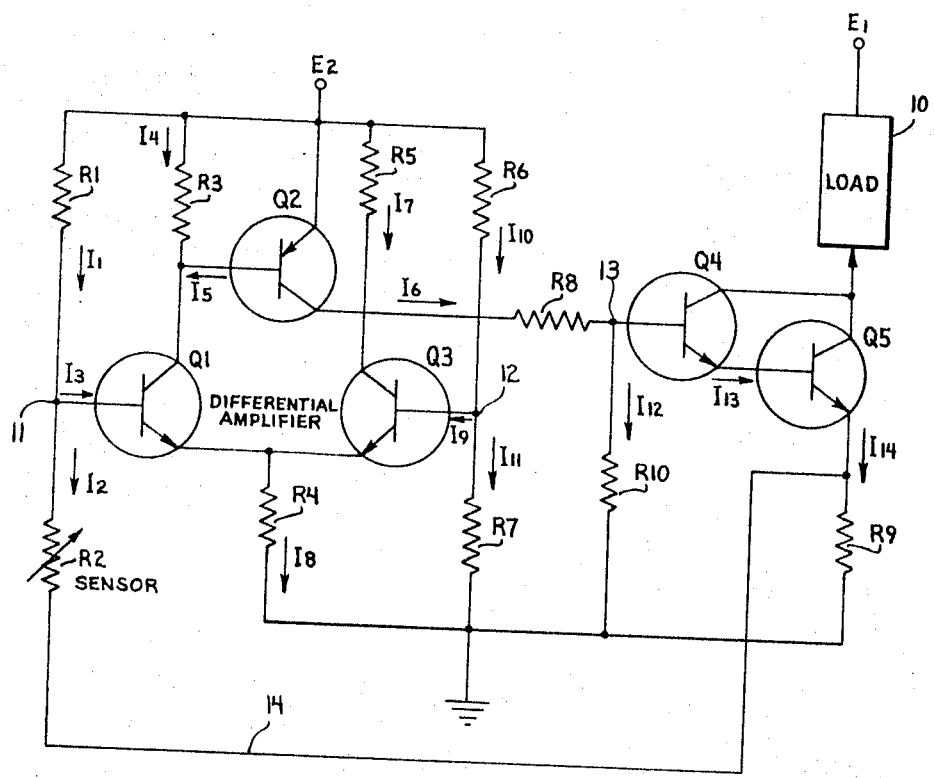

3,446,942
WINDOW DE-ICING CONTROLLER CIRCUIT
Robert M. Letsinger, Greenfield, and James K. Parmerlee, Indianapolis, Ind., assignors to the United States of America as represented by the Secretary of the Navy
Filed Jan. 10, 1967, Ser. No. 608,457
Int. Cl. H05b 1/02
U.S. Cl. 219—501                                          2 Claims

ABSTRACT OF THE DISCLOSURE

A transistor switching circuit having a thermistor sensor in an environment, such as an aircraft window shield or missile window or dome to sense temperatures where icing would begin, to switch "on" a load window heater circuit to prevent fogging and icing without the use of mechanical switching relays.

BACKGROUND OF THE INVENTION

This invention is in the field of temperature responsive controller circuits to electronically switch "on" and "off" a load circuit including an electric heating element.

The known prior art, while utilizing controller circuits responsive to a thermostat to switch a heater circuit, relies on a low voltage circuit as a control circuit and a high voltage circuit as a heater circuit. Since the heater circuit always requires high current demand, the low voltage control circuit is placed in circuit with the coil of a relay switch which switch is in the circuit of the high voltage heater supply. The disadvantages of relay switch circuits are the slowness of operation and the poor reliability of make-and-break contacts. A known silicon controlled rectifier (SCR) switch control circuit, while being completely electronic, produces spiking interference which is intolerable. In this invention the circuit is entirely electronic avoiding the maintenance of electrical switch contacts necessitated by relay switches and the high spiking voltages caused by the use of SCR's.

SUMMARY OF THE INVENTION

This invention utilizes transistors in both the low voltage and high voltage circuits. A negative temperature coefficient thermistor is used as a sensing element in the environment to be controlled, such as a window shield. The thermistor is coupled as one input to a transistor differential amplifier, the output of which triggers a pair of transistors coupled in complement to switch the load heater circuit to maintain the window shield free of fog and ice. A transistor amplifier is used in the coupling between the differential amplifier and the transistor switch with a feedback to the sensor to cause the transistor switch to be saturated in the "on" condition and to be rapidly cut off in the "off" condition. It is therefore a general object of this invention to provide a completely electronic switching circuit to control a heater current to an electric heater to prevent fogging and icing in an environment, such as a window shield or dome of an aircraft or missile device.

BRIEF DESCRIPTION OF THE DRAWINGS

These and other objects and the attendant advantages, features, and uses will become more apparent to those skilled in the art as a more detailed description proceeds when considered along with the single figure of drawing illustrating in circuit schematic the preferred embodiment of the invention.

DESCRIPTION OF THE PREFERRED EMBODIMENT

Referring more particularly to the drawing shown in circuit schematic, a load element 10, such as an electrical heating element or the like, is coupled in a primary load circuit supplied by voltage E1 and in series with the collector and emitter of a transistor Q5 and a resistor R9, the opposite pole of the supply voltage being shown as a fixed potential such as ground. This primary load circuit is under the control of a secondary control circuit supplying a low voltage between terminal E2 and ground. The load heater element 10 is positioned to heat a window shield, dome, or other means in an environment where it is desirable to maintain its fog-free and ice-free, and a sensor element R2 is placed in this same environment. Sensor R2 is a negative temperature coefficient thermistor element coupled in series with a resistor R1 from the low voltage source E2 and in series with R9 to the fixed potential or ground source. The terminal junction of R1 and R2, identified by the reference character 11, is coupled to the base of one transistor Q1 constituting one-half of a differential amplifier consisting of NPN transistors Q1 and Q3 and the biasing circuitry therefor. The collector of Q1 is coupled to E2 through a collector load resistor R3 while the collector of Q3 is coupled to E2 through a collector load resistor R5. The common emitter coupling of transistors Q1 and Q3 is coupled through an emitter biasing resistor R4 to ground. The base of transistor Q3 is coupled to a terminal junction 12 in a voltage divider circuit R6 and R7 connected between E2 and ground. The terminal point 12, being the junction of resistor R6 and R7, establishes a fixed reference base voltage on the transistor Q3 while the terminal point 11 will vary in accordance with the resistance of R2 operating as a sensor in the environment to be controlled.

The output of the differential amplifier is taken from the collector of transistor Q1 and applied to the base of a PNP transistor Q2 having its emitter directly coupled to the low voltage supply E2 and its collector coupled in series through resistors R8 and R10 to the fixed potential or ground. The junction point 13 of resistors R8 and R10 is coupled to the base of a transistor Q4 of a transistor switch consisting of NPN transistors Q4 and Q5 coupled in complement; that is, the collectors of Q4 and Q5 are coupled in common and the emitter of transistor Q4 is coupled directly to the base of transistor Q5, the collector and emitter of transistor Q5 being connected in series in the primary load circuit, as hereinbefore stated.

OPERATION

In the operation of the invention let it be assumed that the primary and secondary load voltages E1 and E2 are switched "on" and that the sensor R2 is in such a temperature environment to maintain the "off" condition of the control circuit. The schematic circuit in the figure shows arrows as identification of current flow by I₅ 1 through 14. Under this condition transistors Q1, Q2, Q4, and Q5 will be in the quiescent condition while Q3 is conducting in accordance with the bias established at terminal point 12. I2 (R2, R9) will be less than $I8R4 + Q1V_{BE}$. I3, I4, I5, I6, I12, I13, and I14 will be zero, except for base-emitter current leakage. $I9$ will be $I7 \div Q3_B$. $I11R7$ will equal $I8R4 + Q3V_{BF}$. The voltage divider R6 and R7 forms a reference voltage divider for the differential amplifier Q1, Q3 and this voltage at terminal 12 is compared with a voltage established at terminal point 11 by the sensor R2.

Under the condition that the temperature in the environment drops to a point where a fogging or icing condition may start, the sensor R2 temperature will drop accordingly and increase the resistance of the thermistor R2 proportional to the temperature drop. R1, R2, R6, and R7 are so related that when fogging or icing condition nears, the increase of resistance in the sensor R2 will raise the voltage point at terminal 11 to render Q1 conductive producing a voltage drop on the base of transistor Q2 thereby rendering this transistor conductive to establish I6 thereby producing a rise in voltage at terminal point 13 to place Q4 and Q5 into conduction. Conduction of transistors Q4 and Q5 raises the emitter voltage of Q5 by virtue of I14 current flow producing a positive feedback by way of conductor 14 on the sensor R2 increasing the voltage at terminal point 11 to increase the driving current I3 and thus render Q2, Q4, and Q5 more conductive until Q5 is saturated and a stable operating point of supplying current to the load 10 is reached. Accordingly, the environment, such as the window shield or dome on which load 10 is placed, will become heated thereby decreasing the resistance of the thermistor sensor R2 until a point is reached where the voltage at terminal point 11 is less than the reference voltage at terminal point 12 providing inputs to the differential amplifier Q1, Q3, to switch Q1 "off" and Q3 "on," or into conduction, as in the first described state of operation. The return of Q1 to its quiescent state raises the base voltage of Q2 rendering it nonconductive at the same time rendering Q4 and Q5 nonconductive in a snap action manner. The time lag provided by the operation of the thermistor sensor R2 and the internal resistance of the transistors Q1 and Q3 provides a temperature differential in the load environment which is desirable in maintaining the window shield, dome or windshield being transported through the atmosphere at a temperature to prevent all icing or fogging conditions. The differential amplifier in combination with the transistor amplifier Q2 and the positive feedback 14 from the load circuit provide a snap action "on" and a snap actiton "off" circuit for controlling the load heater 10.

While many modifications and changes may be made in the constructional details and features of this invention by utilizing equivalents, as reversed polarities and NPN and PNP transistors reversed from those of the preferred form of the circuit shown herein within the spirit of this invention, we desire to be limited in the scope of our invention only by the scope of the appended claims.

We claim:
1. A temperature responsive controller circuit comprising:
   a load heater circuit in an environment to be heated with an electronic switch in said circuit, said electronic switch consisting of first and second transistors coupled in a complementary manner with the commonly coupled collectors of both and the emitter of the second coupled in said load circuit;
   a thermistor in said environment having one terminal coupled to said load heater circuit;
   a control circuit voltage supply across a voltage divider; and
   a differential amplifier having one input coupled to the other terminal of said thermistor and another input coupled to said voltage divider and having an output coupled through a transistor amplifier to the base of said one transistor in said electronic switch for energizing said load heater circuit under one condition of temperature and to break the load heater circuit under another condition of temperature whereby the temperature in said environment is maintained within predetermined limits.

2. A temperature responsive controller circuit as set forth in claim 1 wherein:
   said load heater circuit includes a heater element, said collector and emitter of said other of said pair of transistors in said electronic switch, and a resistor in series in said circuit with said one terminal of said thermistor coupled between said other transistor and said resistor.

References Cited
UNITED STATES PATENTS

| | | | |
|---|---|---|---|
| 2,967,924 | 1/1961 | Friend | 219—501 |
| 3,360,693 | 12/1967 | Fickweiler | 219—505 |

BERNARD A. GILHEANY, *Primary Examiner.*

F. E. BELL, *Assistant Examiner.*

U.S. Cl. X.R.

219—505, 510